United States Patent [19]

Roemer et al.

[11] 4,242,559
[45] Dec. 30, 1980

[54] METHOD AND APPARATUS FOR THE ELECTRO-EROSIVE MACHINING OF WORKPIECES WITH AUTOMATIC THREADING OF THE ELECTRODE

[75] Inventors: Hans Roemer; Klaus-Peter Steil, both of Munich, Fed. Rep. of Germany

[73] Assignee: Siemens Aktiengesellschaft, Berlin & Munich, Fed. Rep. of Germany

[21] Appl. No.: 968,220

[22] Filed: Dec. 11, 1978

[30] Foreign Application Priority Data

Dec. 14, 1977 [DE] Fed. Rep. of Germany ....... 2755777

[51] Int. Cl.³ .............................................. B23P 1/12
[52] U.S. Cl. ................................ 219/69 W; 219/69 M
[58] Field of Search .......................... 219/69 W, 69 M

[56] References Cited

U.S. PATENT DOCUMENTS

| 3,636,296 | 1/1972 | Semin ................................. 219/69 W |
| 3,891,819 | 6/1975 | Ullmann et al. ................... 219/69 W |

FOREIGN PATENT DOCUMENTS

2619261  11/1977  Fed. Rep. of Germany .

Primary Examiner—C. C. Shaw
Attorney, Agent, or Firm—Hill, Van Santen, Steadman, Chiara & Simpson

[57] ABSTRACT

An apparatus and method is disclosed for the automatic treatment of workpieces with the aid of numerically controlled wire erosion machines. When an end point of a contour is reached during the treatment process, the drive and guide system for the wire-like or strip-like electrode is disconnected and beneath the workpiece the electrode is clamped by means of two feed rollers and provided with a groove by a grooving device. Then the upper drive device is switched on again and the electrode is broken off at the groove point. Following the positioning of the workpiece, the beginning of the electrode is threaded into the new starting bore of the contour by means of the two feed rollers, is gripped by a gripper following the workpiece, and is fed to the upper drive device.

21 Claims, 22 Drawing Figures

METHOD AND APPARATUS FOR THE ELECTRO-EROSIVE MACHINING OF WORKPIECES WITH AUTOMATIC THREADING OF THE ELECTRODE

BACKGROUND OF THE INVENTION

The subject of the invention is a process and a device for carrying out the process of electro-erosive treatment of workpieces by wire-like or strip-like electrodes. A path of the relative movements between the workpiece and the electrode is controlled by means of an electronic control system. The wire-like or strip-like electrode is threaded by a drive and guide system from the feed side into a starting bore of the contour which is provided in the workpiece and is thrust or drawn through the starting bore until the electrode forms an active connection with a delivery side of the drive and guide system.

Wire eroding machines, in particular those controlled numerically, can be used with great advantage for cutting complicated outer or inner contours on electrically conductive workpieces. As is known, during the treatment process wire-like or strip-like electrodes and workpieces move relative to one another. The electrode is drawn off from a feed roller, moves past the workpiece which is to be treated, and passes through a drive device which consists of a pair of rollers and which provides the electrode with a uniform forwards movement. Finally the electrode is rewound onto a roller or chopped into small pieces which fall into a waste container. A sensor arranged between the feed rollers and the workpiece checks for the presence of a slight mechanical tensile stress in the electrode. If there is no tensile stress due to a disturbance, the sensor disconnects the electrical voltage which produces the erosive sparks, disconnects the numerical control system and brings the forwards movement of the electrode to a halt.

In spite of the provision of a numerical control system, commercially available erosion machines require the presence of an operator since the threading of the electrode into the starting bores in order to produce inner and outer contours necessitates manual intervention. In order to avoid this disadvantage it has already been proposed to provide a special cutting and feed device for the electrode and a mobile gripper to introduce the electrode into the transport path used for normal operation. The known threading device has the disadvantage that the threading procedure necessitates intervention in the control device since a large number of movement sequences must be executed. The known device does not operate reliably since precise setting and coordination of the fixing procedure, cutting-off procedure and feed motion is difficult. Moreover copper deposits are formed on the cutting tool resulting not only in a faulty mode of operation but also a heavy wear on the tool.

SUMMARY OF THE INVENTION

It is an object of the invention to provide a process and a device for electro-erosive treatment of workpieces with a wire-like or strip-like electrode, wherein the threading process into the starting bore of the next contour which must be carried out when a contour has been completed is carried out fully automatically and reliably.

The object is realized in accordance with the invention in that when the end point of a contour has been reached, the drive and guide system is disconnected and in dependence thereupon at the feed side of the electrode a clamping device which serves to clamp the electrode is actuated in front of the workpiece. A grooving device provides the electrode with a groove between the clamped point and the workpiece and following the grooving of the electrode the drive system which is arranged on the delivery side of the electrode following the workpiece is connected and during the forward movement the electrode is broken off at the grooved point. A starting bore for the next contour is positioned by means of the electronic control system and the clamping device releases the electrode and a feed device which is not engaged during the processing of the workpiece threads the beginning of the electrode into the new starting bore and moves it forward beyond the workpiece to a distance which has been established prior to the processing. Following the workpiece a gripper is caused to approach the projecting part of the electrode to grip the electrode and feed it to the drive system arranged following the workpiece. When the beginning of the electrode has been gripped by the drive system the processing of the workpiece in the new contour is continued.

The new process takes place fully automatically so that no operator is required for the threading process during the processing of various contours on the workpiece. The loading of the erosion machine is particularly economical since the processing of the workpieces can be carried out by day and night. The process is particularly simple. The grooving of the electrode and the following breaking-off process means that the beginning of the electrode is stretched or extended while cold and remains stiff. As a result, when the electrode is advanced it can be threaded absolutely reliably into the new starting bore. The new process has the advantage that only a slight additional modification of the electronic control devices is required. The electrical pulses required for the automatic running of the threading process are derived from the functions already provided in known erosion machines and are already available in the control system. The automatic threading procedure is controlled by means of a few additional electronic construction stages. Thus it is easily possible to subsequently employ the automatic threading process in known erosion machines.

A further advantageous development of the process consists in that when the end point of a contour has been reached, for the duration of the threading process the water supply, known per se, for the coaxial flushing is moved away from the electrode and the current supply is lifted away from the electrode. The removal of the water and current supply allows the threaded electrode to be automatically inserted into the current supply.

DESCRIPTION OF THE PREFERRED EMBODIMENTS

The illustrations in the Figures have been partially simplified. Thus particular structural details with which the expert will be familiar and which are not closely related to the invention have been entirely omitted in order to simplify the drawing and improve the clarity of lay-out. Moreover, certain components have been removed or are shown in fragmentary fashion in the Figures.

Figure 1:
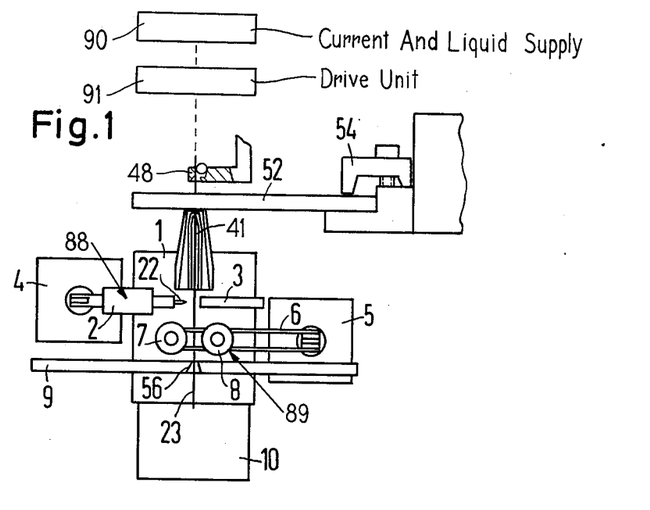
FIGS. 1 and 2 illustrate the threading head of the threading device in two different views.
Figure 2:
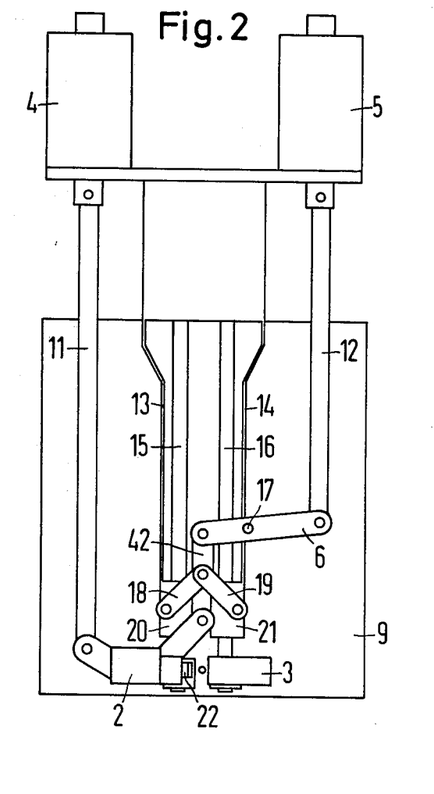

FIG. 1 illustrates the threading head in a front view. The gripper or claw 48 which is arranged above the workpiece 52 has been illustrated in more detail in FIGS. 9 to 13. The threading head consists of a clamping and feed device 89 and a groover 88. A guide 41 is provided along with a drive unit 91 and a current and liquid supply 90. FIG. 2 is a view from above, in which the workpiece and support device have not been shown in order to improve the lay-out clarity. In accordance with FIGS. 1 and 2, a transmission block 1 is secured to a built-on plate 9. Two leaf spring arms 13 and 14 are arranged forward at the sides of the transmission block and hold the bearing blocks 20 and 21. In the latter are mounted the drive shafts 15 and 16 whose front ends are secured to the feed rollers 7 and 8 which also carry out the clamping function. The drive shafts 15 and 16 are connected to a motor 10 via a worm gear in the transmission block 1. Behind the transmission block on the right-hand and left-hand sides are arranged two solenoids 4 and 5 which, as a result of their forwards movement via the connecting rods 11 and 12, compress the feed rollers 7 and 8 via a lever mechanism 6, 17, 18 and 19 and advance the grooving lever 2 with the grooving wedge 22 on the anvil 3. The wire-like electrode 23 is drawn from the feed side of the electrode via the inlet opening 56 in the built-on plate 9 and via the guide nozzle 41 through the starting bore of the contour of the workpiece 52. The workpiece 52 is secured together with the support device 54 on the cross-support of the machine. During the processing, the electrode is coaxially flushed with a liquid dielectric. At the end of the processing of a contour the wire erosion machine is disconnected by the electronic control system, i.e. the supply of the dielectric is blocked, the current supply between electrode and workpiece is suppressed, and the drive system for the electrode is disconnected. The next contour can then be processed. The new process commences at this instant, and only the signals for end-of-contour positioning of workpiece, and for reaching of the new starting bore need be obtained from the control system. Thus it is unnecessary to intervene in the control system. Only existing functions of the machine are used to control the threading process.

When the end point has been reached, with the slow relative feed movement between workpiece and electrode and the recognition of the control signals, the electrode is clamped beneath the workpiece by the clamping device. Following the clamping, the groover is triggered which grooves the electrode and itself switches on the drive system arranged above the workpiece on the delivery side of the electrode. As a result of the further movement of the electrode, the latter is broken off at the groove point. The drive system conveys the remainder of the electrode to the delivery side where it is wound on to a coil or cut into small pieces by a cutting device and filled into a waste container. During the breaking-off process, the groover or an electronic contact which responds when the electrode is broken off triggers the positioning of the workpiece for the next contour. This is carried out in such a way that the control system switches over to rapid motion. The positioning process is completed when the starting bore arrives above the lower guide nozzle. At this instant the control system of the machine gives the command to operate at a slow feed movement. This electronic signal starts the gripper which is caused to approach the starting bore above the workpiece. The gripper is electrically stopped when it contacts the workpiece. The signal which serves to stop the gripper triggers the feed device for the electrode so that the latter is threaded through the guide nozzle and the starting bore.

An optical scanner and an electronic counter serve to measure the electrode feed path which is dependent upon the thickness of the workpiece. When the set count has been reached, the feed is concluded and the feed device is deactuated. The gripper has gripped the electrode when it has passed through and when the set count is reached the counter signal starts the movement of the gripper in the direction of the upper drive system whereby the clamping by the clamping device is discontinued. When the upper end point is reached, the beginning of the electrode is gripped by the moving upper drive system and is conveyed to the delivery side. A first electric contact triggers a pivot movement of the gripper out of the path of the electrode by an electrode guide, and a further electric contact which is actuated by the taut electrode releases the dielectric supply and switches on the current supply. De-ionized water can be advantageously used as dielectric. Then the new contour is processed, the procedure of which is programmed in a punched strip which is input into the electronic control system.

The realization of the process will be explained in the advantageous devices which are described in the following and illustrated in the Figures.

Figure 3:
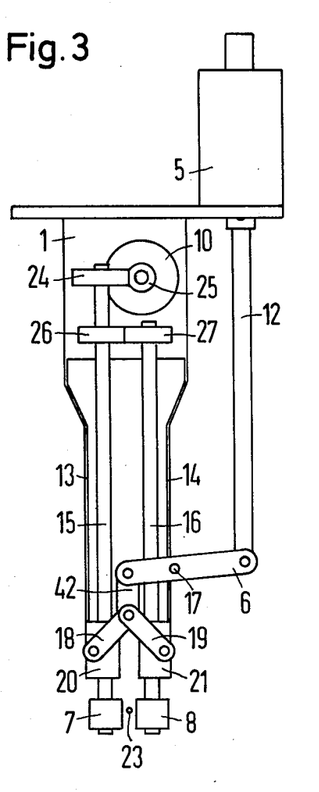
FIGS. 3 and 4 illustrate the clamping and feed device in the rest and operating positions.
Figure 4:
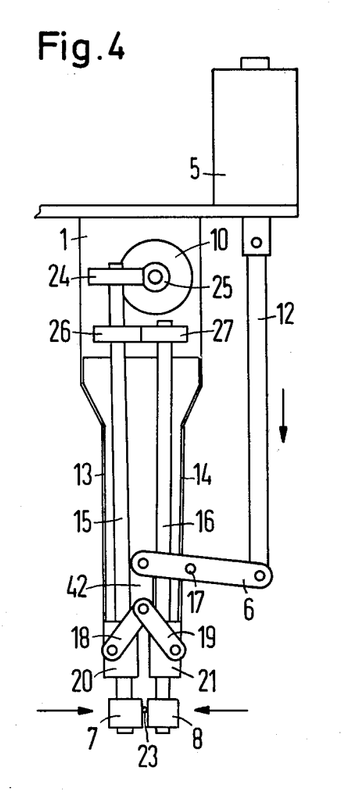
Figure 5A:
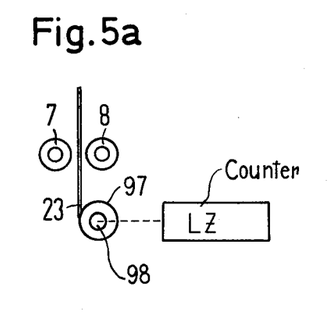
FIGS. 5a to 5b illustrate the fundamental function of the device during the clamping and feed of the electrode.
Figure 5B:
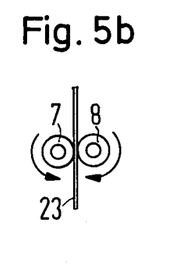

FIGS. 3 and 4 illustrate the clamping and feed device in the rest and operating positions, one device fulfilling both functions. FIG. 3 illustrates the device in the rest position during the erosion process. FIG. 4 illustrates the device in the operating position during the automatic threading process. At the end of the erosion process, i.e. when the erosion of the workpiece contour has been completed, the wire electrode 23 must be clamped and following the cutting off, which will be discussed in detail below, the electrode must be moved upwards through the starting bore of the workpiece for the next contour which is to be cut. The time at which the threading procedure must commence is logically recognized from the punched strip for the workpiece from a specific, consecutive sequence of code signals. This threading procedure commences with the clamping of the electrode 23 and the subsequent grooving and breaking-off. This must be manually triggered by the actuation of a switch. First the solenoid 5 is excited whereby the feed movement of the connecting rod 12 is triggered in the direction of the arrow. The lever arm 6 which is rotatably secured thereto is moved about its pivot which is fixed by a pin 17. At the other end of the lever arm, a connecting rod 42 withdraws the two flanks 18 and 19 at their apex and presses against one another the bearing blocks 20 and 21 which are connected with the drive shafts 15 and 16 mounted therein. The pivot movement of the drive shafts can be identified with the spherical bearings in the transmission block 1 as the play in the spherical bearings with a pivot angle of 1° is fully adequate. The electrode 23 is now clamped by the feed rollers 7 and 8 which rest firmly on the drive shafts 15 and 16. The latter has a slightly toothed profile which has the advantage that it prevents the electrode from slipping through during the breaking-off process and the abrasion dust is deposited only in the recesses between the teeth. Following the breaking off of the electrode 23 and the mechanical advance of the workpiece to the next starting bore (positioning), the electrode is moved upwards through the new starting bore. Via a worm drive 25, a motor 10 starts a worm wheel 24 which is permanently connected to the shaft 15. With the aid of two identical toothed wheels 26 and 27, the shaft 16 and thus the feed roller 8 are provided with the opposite direction of rotation to the shaft 15 and the feed roller 7. FIG. 5b illustrates the feed rollers 7 and 8 following the clamping process during the advance of the electrode 23. FIG. 5a illustrates the feed rollers 7 and 8 which are not engaged with the electrode prior to and following the threading process.

The feed rollers 7 and 8 which move towards one another, and which are still pressed against one another by the lever mechanism, move the electrode 23 upwards first through the guide nozzle 41 and then into the starting bore of the workpiece. The upwards movement continues until an electrode length which has previously been set in accordance with the workpiece thickness is drawn across a guide wheel 97 having a counting device LZ, and the motor 10 is switched off. The length of the electrode which has been advanced is optically measured by means of a light source, a photo-diode, and a plate 98 provided with an oblong perforation and fixed to the guide wheel. When the electrode is advanced, the guide wheel is moved and the light beam is temporarily interrupted by the oblong perforations so that pulses occur at the output of the photo-diode and are fed to the electronic counter. When the set counter end value has been reached, the motor is disconnected, the gripper above the workpiece grips the electrode, the solenoid 5 drops, and the feed rollers 7 and 8 return to their rest position as a result of the bias of the leaf spring arms 13 and 14, and the electrode 23 is released (FIG. 3, FIG. 5a). The counter end value is set in dependence upon the workpiece thickness, for example, in such a way that the electrode projects by 16 mm beyond the workpiece.

Figure 6:
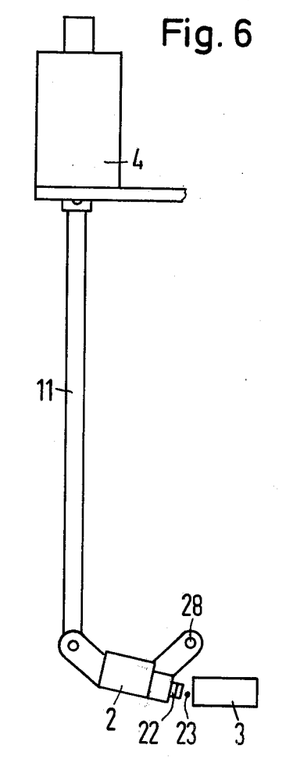
FIGS. 6 and 7 illustrate the grooving device in the rest and operating positions.
Figure 7:
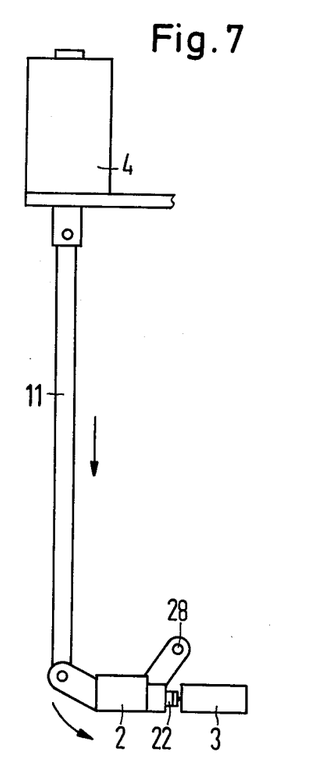
Figure 8A:
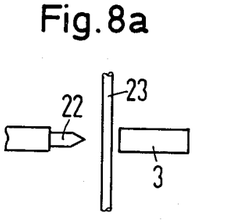
FIGS. 8 to 8c illustrate the grooving and breaking-off process of the electrode.
Figure 8B:
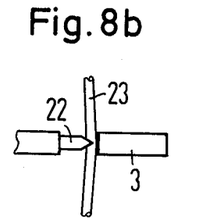
Figure 8C:
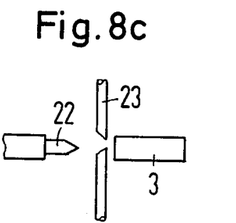

The grooving for the subsequent breaking-off of the electrode is achieved by means of the groover illustrated in FIGS. 6 and 7. FIG. 6 illustrates the groover in the rest state and FIG. 7 in the operating state. FIGS. 8a to 8c illustrate the grooving and breaking-off process of the electrode. Immediately following the clamping of the electrode by the feed rollers, the solenoid 4 is traversed by current. The armature moves the connecting rod 11 forward in the direction of the arrow, and the grooving lever 2 rotates in the direction of the arrow about its rotary pin 28. When the grooving wedge 22 has been inserted it strikes against the wire electrode 23, moves it onto the anvil 3, and provides it with a groove (FIG. 8b). In the most favorable circumstances, the depth of the groove amounts to approximately 4/5 of the electrode diameter. As the feed rollers 7 and 8 (FIG. 4) clamp the electrode and the transport rollers of the drive system which are arranged at the top of the machine continue to operate, the electrode is broken off (FIG. 8c) and the upper end continues to the delivery side, for example, to a chopper.

The grooving wedge 22 is laterally offset to enable it to be turned round and reused when it has suffered wear. This also applies to the anvil 3 which is vertically offset and can be reused when turned round. The grooving wedge 22 can also be adjusted by means of a counter-screw when it has been shortened due to wear. Following the grooving and breaking off of the electrode 23, the solenoid 4 is disconnected and the connecting rod together with the grooving lever 2, possibly supported by a tension spring, is returned to the starting position (FIG. 6, FIG. 8a). FIGS. 9 to 12 illustrate the gripper in various operating positions. Following the breaking off of the electrode and the withdrawl of the remainder of the electrode from the workpiece, the support together with the workpiece moves at a high speed to the starting bore of the new contour. When this starting position has been reached, the rapid motion is disconnected and the gripper is started. The gripper consists of a sliding tube 43 which is secured at the upper end to the delivery side of the electrode. A bearing 44 with a clamping arm 47 and a claw 48 are arranged so as to be displaceable in the sliding tube. The bearing 44 moves with the aid of a tread roller 45 in a coulisse 46 which runs at the periphery in the longitudinal direction. This precisely determines the movement of the clamping arm 47.

Figure 13A:
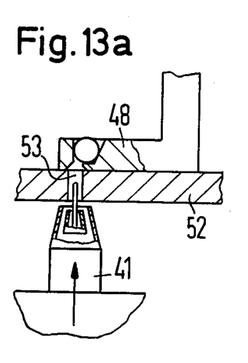
FIGS. 13a to 13c illustrate the mode of operation of the gripper during the threading of the electrode into the starting bore.
Figure 13B:
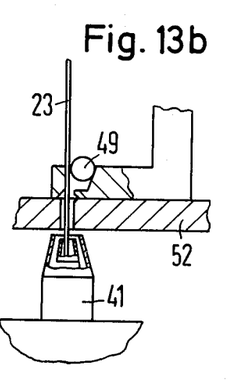
Figure 13C:
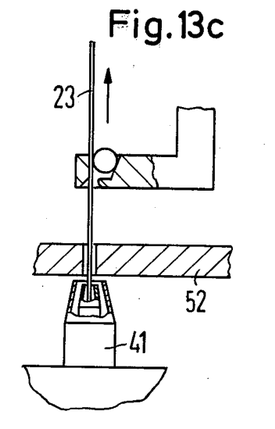

Following the start of the gripper, the clamping arm 47 slides downwards in the coulisse 46 to the starting bore 53 in the new counter (FIG. 13a). When the claw 48 strikes against the workpiece 52, the downwards movement is stopped by an electrical switch which has not been illustrated. When the electrode 23 is moved by the feed device (FIG. 4, FIG. 5a) through the guide nozzle 41 and the starting bore 53, the beginning portion of the electrode is gripped by the claw 48. FIGS. 13a to 13c illustrate the gripping and conveyance of the electrode by the claw 48 in accordance with the principle, known per se, of roller clamping. The claw consists of a recess in which a clamping roller 49 is inserted so as to be mobile on an oblique side wall. The electrode 23 is moved via the guide nozzle 41 through the starting bore 53 into the claw 48 (FIG. 13a). During the movement into the claw 48, the mobile clamping roller 49 is moved upwards by the electrode on an oblique surface, forming a gap for the electrode to pass through (FIG 13b). When the electrode 23 has reached that level above the workpiece 52 which has been determined by the contour setting, the feed is stopped and the clamping arm 47 is lifted up from the workpiece in the direction of the arrow (FIG. 13c). Due to the oblique surface, the electrode is wedged with the clamping roller 49 and thus prevented from slipping through.

Figures 9, 10:
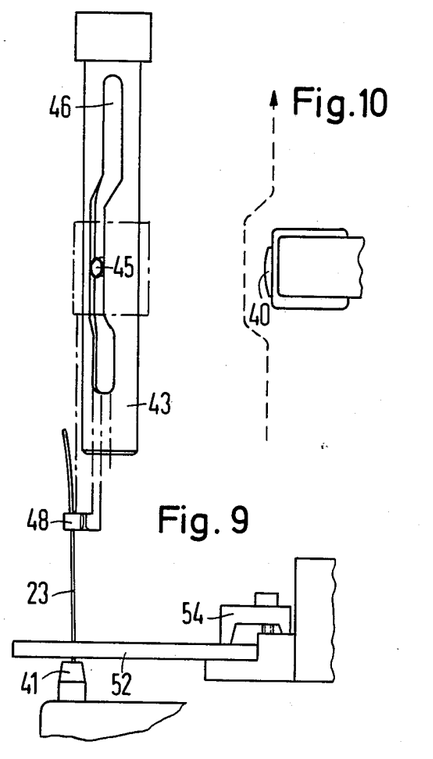
FIGS. 9 to 12 illustrate the grippers in various operating positions.
Figure 11:
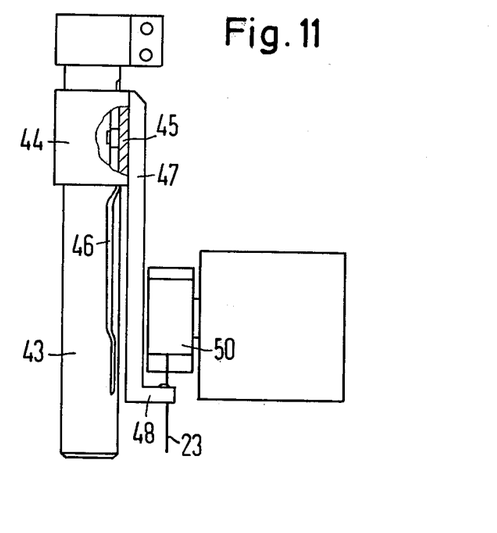
Figure 12:
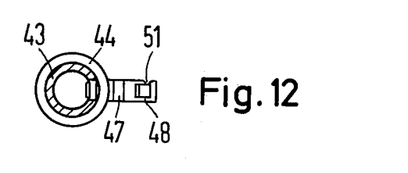

FIG. 9 illustrates the gripper in the position when the clamping arm 47 has lifted up from the workpiece 52. During the upwards movement of the electrode 23, the clamping arm 47 and thus also the electrode 23 occasioned by slit guidance, executes a pivot movement about the electrode guide 40 (shown in FIG. 15) into which the electrode is subsequently inserted. FIG. 10 illustrates in broken lines the movement sequence of the clamping arm when it slides up the sliding tube. During the sliding upwards of the clamping arm 47, the end of the electrode 23 which projects from the claw 48 is gripped by the transport rollers 50 of the upper drive system and pulled upwards. The position of the gripper at this instant is shown in FIG. 11. As a result of the drawing movement of the transport rollers, the clamping roller 49 is moved upwards and the electrode 23 can slide through the claw 48. Then the clamping arm is returned to its rest position which it occupies during the erosion process. The rest position is advantageously fixed to lie in the pivot range of the clamping arm movement. For this purpose the clamping arm is moved downwards again. As the clamping action of the claw 48 with the clamping roller 49 no longer exists during the downwards movement, in the pivot range the clamping arm 47 is pivoted out of the direction of movement of the electrode 23 via the lateral opening 51 in the claw 48 which has been illustrated in the plan view of the gripper shown in FIG. 12. Therefore the gripper is reliably prevented from obstructing the erosion process of the workpiece.

The return of the clamping arm into the rest position is controlled by electric switches which have not been illustrated in the Figures. The use and arrangement of such switches is known per se. For this purpose it is necessary to arrange a switch in the upper end point of the upwards movement in the region of the coulisse, which switch stops the upwards motion and triggers a downwards motion. In order to stop the downwards motion, a further electrical switch is arranged in the pivot range of the coulisse which can only be moved out of the upper position during the downwards movement and which stops the motion of the clamping arm. The clamping arm is started from this rest position on the occasion of the next threading process. A new erosion process is triggered via an additional electric contact which is actuated by the taut electrode.

Figure 14:
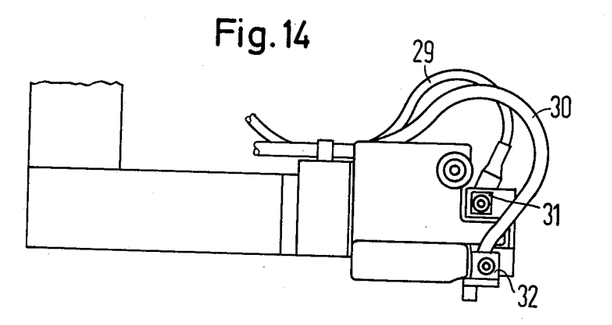
FIGS. 14 to 16 illustrate the water and current supplies in the operating and rest positions.
Figure 15:
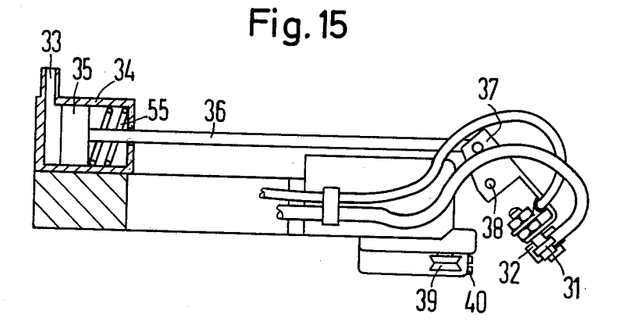
Figure 16:
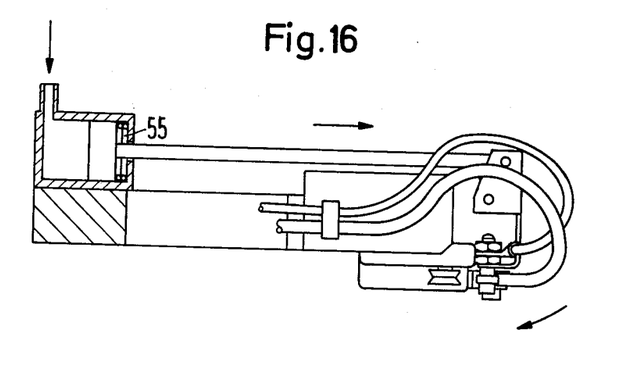

FIGS. 14 to 16 illustrate a hydraulically operable water and current supply system which can be pivoted into and out of position. FIG. 14 illustrates the pivoting device for the water and current supply in a front view in the operating state, i.e. during the erosion process. FIGS. 15 and 16 are a plan view of the pivoting device during the threading process and in the operating state. The actual operating guides of the electrode are v-shaped prism guides into which the wire is inserted by tensile stress and supplied with current via loops. Pressure rollers ensure a good contacting. For the threading in of the electrode, it is particularly advantageous for the overarm with pressure rollers, current supply, and dielectric supply to be swung in and out of position as this can render the insertion simple and reliable. When the electrode has been threaded through the starting bore in the workpiece and tensioned by the transport rollers of the upper transport system, the current supply and the coaxial water flushing must be brought into contact with the electrode. In an advantageous exemplary embodiment illustrated in FIGS. 14, 15 and 16, hydraulic application of the supplies on the basis of the pressure of the dielectric when the pump is switched on is used. As soon as the electrode is taut, the electrode transport and the water pump are switched on via an electric contact and via the machine control unit. A pressure cylinder 34 is supplied with the dielectric emanating from the pump through the opening 33 via a tube. When the cylinder is filled with dielectric, the piston 35 together with its connecting rod 36 is moved forwards in the direction of the arrow (FIG. 16). The pressure angle member 37 which is connected in mobile manner to the end of the connecting rod 36 swings about its rotation point bolt 38. The pressure angle member is used to press the dielectric supply 32 and the current supply 31 against the electrode. In addition the electrode is tensioned between the segment guide 40 and the guide wheel 39. This wire guidance causes a precise positioning of the electrode in the guide 40 and a good contact pressure on the current supply. The current cable 29 and the water tube 30 are flexible and imitate the pivot movement of the pressure angle member 36.

When the erosion process is completed, the control unit disconnects the water pump. The water pressure falls and the piston 35 is withdrawn by means of a spring 55, and the pressure angle 37 is pivoted out of position via the connecting rod 36. When a new threading process is started, the electrode is again drawn upwards by a gripper between the transport rollers of the drive system, unobstructed by the guide 40 and the pressure angle 37 which has been pivoted out of position. The transport rollers grip the electrode with which they are presented, and move it via a guide component, for example, to a chopper which cuts the electrode into small wire pieces and feeds these to a collector container.

Figure 17:
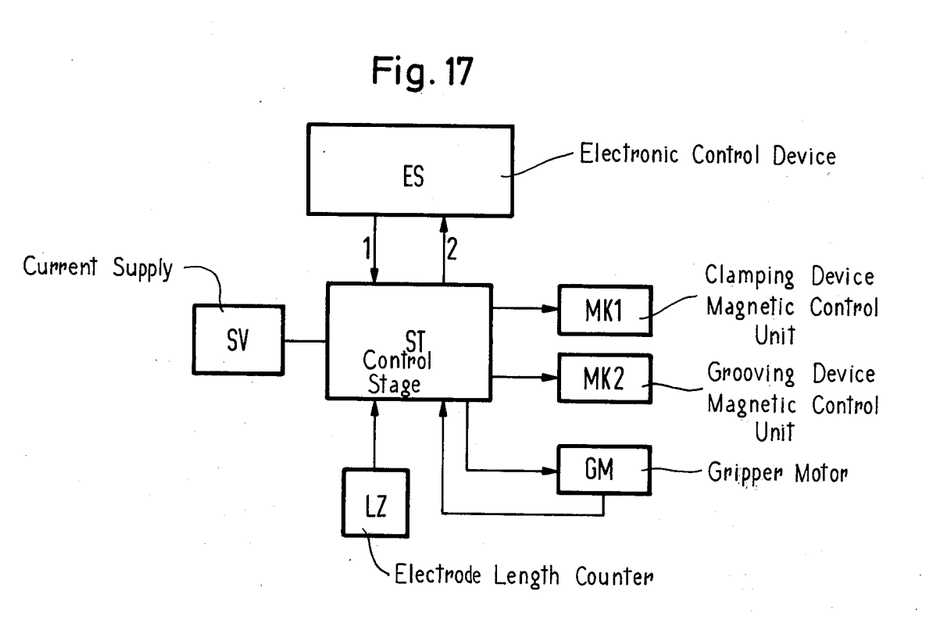
FIG. 17 is a block circuit diagram of the electronic device for the new process.

FIG. 17 is a fundamental block circuit diagram of the new process. An additional electronic control stage ST with a separate current supply SV has been provided. Technicians skilled in this art will be sufficiently familiar with the requisite electronic components and their cooperation given the functional description provided in this specification. At the end of the erosion process on one contour of the workpiece, a stop signal is emitted from the electronic control device ES for the erosion machine via the line 1 to the control stage. Simultaneously to this signal, the drive system, water pump and current supply are disconnected. The magnetic control unit MK1 of the clamping device is triggered by the stop signal. Following a short delay time, the magnetic control unit MK2 for the grooving device and the drive for the drive system arranged behind the workpiece are switched on. Following the grooving process, the grooving device is disconnected. The workpiece is positioned for the next contour and then the motor control unit GM for the gripper is triggered. Then the feed device for threading the electrode into the starting bore is released. The manually adjustable electrode length contour LZ measures the length of the electrode which has been advanced, stops the feed process when the set counter value has been reached, and returns the gripper motor with the gripper into the rest position. The electrode is now gripped by the drive system and a contact is triggered by the taut electrode which causes the control stage ST to emit a start signal via the line 2 to the control device ES. The start signal switches on the erosion machine for the next erosion process and the new operating sequence is commenced.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A method for the electro-erosive treatment of workpieces with wire-like and strip-like electrodes wherein the path of relative movements between the workpiece and the electrode is controlled by means of an electronic control system, and wherein the wire-like or strip-like electrode is guided by guide means on a feed side of the workpiece and fed by a clamp and feed device means into a starting bore of a contour which is to be provided in the workpiece, and wherein the electrode is thrust through the starting bore by the clamp and feed device means until the electrode is brought into an active connection with a drive means at a delivery side of the workpiece by use of a gripper means, comprising the steps of: stopping the drive means when an end point of a contour is reached and clamping the electrode only on the feed side by actuating the clamp and feed device means to clamp the electrode at a clamping point on the feed side of the workpiece only; grooving the electrode with a grooving device comprising an anvil surface and cooperating grooving edge between the clamping point and the workpiece; starting the drive means and during forwards movement of the electrode the electrode is broken off by pulling at the groove and simultaneously stretched to become stiffer; positioning a starting bore for a next contour to be eroded by means of the electronic control system; threading the end of the electrode into the new starting bore and advancing it beyond the workpiece to a distance which has been established prior to the processing by use of the clamp and feed device means; gripping the end of the electrode with the gripper means and supplying it to the drive means; and when the end of the electrode has been gripped by the drive means a processing of the workpiece in the new contour is continued.

2. The method of claim 1 including the step of pivoting away a water supply for coaxial flushing and raising a current supply from the electrode when the end point of the contour has been reached.

3. A device for the electro-erosive treatment of a workpiece with an electrode, comprising:
  (a) a guide means positioned at a feed side of the workpiece for guiding the electrode towards the workpiece;
  (b) a drive means positioned at a delivery side of the workpiece for pulling the electrode which passes through the workpiece at the location of a contour to be eroded;
  (c) a clamping and feed device means on the feed side of the workpiece for selectively clamping to the electrode at a clamping point and feeding the electrode in a direction toward the workpiece;
  (d) a grooving device means for grooving the electrode between the clamping point and the workpiece; and
  (e) gripper means for gripping the electrode between the workpiece and the drive means for pulling the electrode to break and stretch it after grooving and also to supply the end of the electrode to the drive means during feeding.

4. The device of claim 3 wherein the clamping and feed device means comprises: two approximately parallel flexible arms which are secured on one side to a built-on plate; the arms being provided with bearing blocks in which are mounted drive shafts for two feed rollers which are arranged opposite one another and connect with means for driving them in opposite directions; the feed rollers being spaced from one another in an open operating position such that the electrode which moves between them is uninfluenced; a longitudinally actuatable connecting rod being provided which runs along the arms, and is connected to actuate lever means for pressing the two feed rollers against one another to clamp the electrode and for releasing the feed rollers back to the open operating position when the connecting rod is released.

5. The device as claimed in claim 4 wherein the drive shafts for the two feed rollers are connected via two similar toothed wheels, a worm wheel, and a worm drive to a motor.

6. The device as claimed in claim 4 wherein the connecting rod is actuated by a solenoid and is connected in mobile fashion to a lever arm which is pivotable about a fixed pin, the lever arm being connected in mobile fashion to a connecting rod whose other end is connected in mobile fashion to an apex of two flank members which are secured in movable fashion to the bearing blocks, whereby when the connecting rod is actuated, due to a movement of the apex of the flank members the bearing blocks can be pressed against one another.

7. The device as claimed in claim 4 wherein the feed rollers have a toothed profile means at their periphery for preventing slippage of the electrode when clamped and during feeding.

8. The device of claim 3 wherein the grooving device means comprises: a solenoid and a connecting rod having a groove lever attached thereto which, when the connecting rod is actuated by the solenoid, can be pivoted about a fixed rotating pin in a direction of the electrode; a grooving wedge connected to the grooving lever; and an anvil cooperating with the grooving wedge to groove the electrode.

9. The device as claimed in claim 8 wherein the grooving wedge and the anvil are arranged in such manner that during a grooving process the electrode is grooved outside of a center line between the groove wedge and the anvil.

10. The device of claim 3, characterized in that on the feed side of the workpiece a guide wheel is arranged with a counting device means for manual setting in dependence upon the workpiece thickness and for measuring a distance by which the electrode is advanced, and when a set count has been reached brings the clamping and feed device means into a rest state.

11. The device as claimed in claim 10 wherein a plate is provided with oblong perforations which can be scanned by a light source and a light diode is fixed to said guide wheel, and scanning pulses produced by the light diode which occur during the feed of the electrode can be counted by said counter means, and that when the set count is reached the counter means stops feed by the clamping and feed device means.

12. The device of claim 3 wherein the gripper means comprises: a tube which has a coulisse guide at the periphery, and along which there slides a bearing provided with a clamping arm which runs along the tube and at an end of which there is arranged a claw with a clamping roller means for clamping the electrode.

13. A device as claimed in claim 12 wherein an electric contact means is provided on the gripper means for detecting when the clamping arm has slid back adjacent the workpiece.

14. The device as claimed in claim 10 wherein when the set count is reached the counting device means starts movement of a clamping arm of the gripper means in the direction of the drive means arranged at the devlivery side of that workpiece 15. The device as claimed in claim 12 wherein a time delay means is provided such that at a beginning of feed movement of the electrode, the delay means is triggered and that following a delay time the clamping arm slides back in a direction of the drive means.

16. The device of claim 13 wherein at an end of the coulisse in a vicinity of the drive means there is arranged a first electric switch means which when operated due to a return of the clamping arm causes a direction of movement of the clamping arm to be reversed, and a second means operable by a pivoting movement of the clamping arm to cause the clamping arm to stop in the pivot range.

17. The device of claim 3 wherein when the electrode has been gripped by the drive means an electric contact means is provided for sensing tautness of the electrode so as to trigger by control system means processing of a new contour or to block power to the electrode and supply of liquid.

18. The device of claim 3 wherein a liquid supply means and a current supply means are provided for the electrode; a pressure angle member means for pivoting the liquid supply means and current supply means into and out of position with respect to the electrode; a connecting rod connecting between the pressure angle member means and a spring loaded piston.

19. A system for automatic threading of an electrode into a starting bore of a workpiece in an electro-erosive treatment, comprising:

(a) drive means positioned at a delivery side of the workpiece for pulling the electrode;

(b) grooving device means for grooving the electrode at a feed side of the workpiece to permit break-off of the electrode at the feed side by pulling;

(c) clamp and feed device means for clamping the electrode when the grooving device means grooves the electrode and for feeding the electrode through the starting bore after break-off; and (d) gripper means for pulling the electrode to break and simultaneously stretch it after grooving and also for conveying the end of the electrode to the drive means after being fed through the starting bore.

20. The system of claim 19 wherein a guide means for guiding the electrode into the starting bore and along the contour is provided between the grooving device means and the workpiece.

21. A method for automatic threading of an electrode into a starting bore of a contour of a workpiece in an electro-erosive treatment, comprising the steps of:

(a) feeding an electrode from a feed side of the workpiece into the starting bore;

(b) gripping the electrode on a delivery side of the workpiece and moving the end of the electrode to a drive means for engagement therewith;

(c) pulling the electrode with the drive means and guiding the electrode and workpiece relative to one another so as to erode the contour until a finish point is reached;

(d) stopping the drive means and clamping the electrode at the feedside of the workpiece;

(e) breaking the electrode by grooving between a point of said clamping and the workpiece and activating the drive means to simultaneously stretch and break the electrode by pulling; and (f) repeating the method beginning at step (a).

* * * * *